Feb. 13, 1968  M. B. CRONKHITE  3,369,237
RADIO AID TO NAVIGATION
Filed Aug. 25, 1965  3 Sheets-Sheet 1

INVENTOR.
MINTON B. CRONKHITE
BY
Golove + Kleinberg

United States Patent Office 3,369,237
Patented Feb. 13, 1968

3,369,237
RADIO AID TO NAVIGATION
Minton B. Cronkhite, San Diego, Calif., assignor to Cubic Corporation, San Diego, Calif.
Filed Aug. 25, 1965, Ser. No. 482,446
8 Claims. (Cl. 343—105)

The present invention relates to radio aids to navigation and more particularly, to an improved transmitting system which is utilizable in conjunction with existing radio receiving equipment to enable an indication of the azimuthal direction between the transmitting system and a remote receiver.

Virtually all commercial, and military and most private aircraft in use today, rely heavily on radio aids to navigation. Among these aids are the Omnirange transmitters which, in conjunction with suitable receivers installed in aircraft, give an indication of the proper heading for the aircraft to point towards, or away from the transmitter. Such Omnirange transmitters are clearly indicated on all aircraft navigation charts. Aircraft suitably equipped, have Omnirange receivers that include manually operable means, and an indicator having a pointer needle. By referring to the indicator, the aircraft can be located on a radial line from or to the transmitter.

The transmitters and receivers for Omnirange navigational equipment, which usually operate at Very High Frequencies (VHF), are well known in the art, both as to the apparatus and the method of operation. It is therefore sufficient to note that the airborne or vehicle receiver equipment, is capable of receiving a composite VHF radio signal which includes a 30 cycle component, the phase of which, relative to a reference 30 cycle signal modulated on a 9960 cycle subcarrier, is proportional to the angle between a reference direction line pointing to North from the transmitter and a line from the transmitter, intercepting the vehicle.

In addition to Omnirange equipment, which is normally employed for navigation, radio aids for landing have been developed. A first system Ground Controlled Approach (GCA) radar equipment, monitors the approaching aircraft continuously, Human operators, with the aid of precision displays, use voice communication to transmit instructions and information to the pilot. Heading, altitude, the angle of descent information all enable a pilot to correct his course to achieve a "proper" approach to the airport runway.

An alternative radio system, the Instrument Landing System (ILS) utilizes highly precise transmitting equipment at the airport with well regulated closely controlled radiation characteristics. These include transmitters which generate separate radiation patterns that intersect along a predetermined azimuth approach course. The signals are constantly analyzed in the aircraft on a visual instrument display which has a needle indicator. By observing the orientation of the needle and its relative deflection, a pilot can direct the craft to the center line of the runway. In addition, a glide slope system is utilized which employs the same types of transmitting equipment, except that the radiation patterns are rotated 90° and the "center" line, or plane of radiation pattern intersection, is inclined upwards from the preferred touchdown point on the runway, by a preferred glide slope angle. The signal frequencies used by the glide slope transmitting equipment differ from the azimuth transmitter and require a separate receiver in the aircraft. The glide slope indicator also includes a needle which is positioned horizontally. The combination is usually displayed on a single display instrument, conventionally called a "cross pointer indicator." The correct azimuth and glide slope are indicated by a centering of the vertical and horizontal needles on the face of the indicator, to forming an orthogonal cross.

The "GCA" system, which requires not only an expensive, highly precise radar installation, must also be provided with a human operator in attendance at all time in order to be used. It is the radar operator who must evaluate the displays and direct the pilot by a voice link, who then operates the aircraft. The pilot has no instruments from which the proper course and angle of approach that will result in a perfect landing, can be determined, but must rely solely on the received verbal information, which of course, is subject to radio interference, static and the like.

The "ILS" system on the other hand, is a completely unattended installation, which in turn, provides an instrument display, which provides visual information from which the pilot can direct the aircraft to landing. An "ILS" installation in the aircraft, however, requires at least two separate receivers, and requires rather extensive installations at the airport. The transmitting antennas must be carefully sited to provide correct radiation patterns. Further, terrain irregularity in the vicinity of the final approach course may prevent installation of the glide slope transmitters.

It has long been considered desirable to provide a simple instrument landing system which is inexpensive for the airport to install and maintain, and which will not require anything more than the equipment normally found in virtually every aircraft equipped with radio receivers. Since the advent of the Omnirange VOR facilities virtually every private aircraft as well as all commercial and military aircraft are equipped to receive the Omnirange signal transmissions.

Attention is directed to the recently issued patent to W. J. Thompson for Aircraft Landing System, No. 3,111,-671, issued November 19, 1963, in which an "inverted" AME technique was used to provide precise measurements to a pilot of his altitude, distance to the right or left of the runway centerline and distance to touch down. That patent included antenna pairs positioned along a baseline, and also referred to similar Angle Measuring and Distance Measuring Equipment which is described in U.S. Patents Nos. 2,976,530 and 3,148,369.

Those patents described systems which utilize phase measurement at many ranging frequencies to determine unambiguous range. The baseline antenna pair provide angle information, so that target craft could be uniquely located in space. The present invention, however, is not intended to provide range or distance information but rather, only a direction indication, from which a pilot can direct his craft to an airport runway which is not equipped with "ILS" or "GCA," and which may be obscured from visual contact.

It is also possible that the equipment of the present invention can be used to mark the location of temporary air strips in unfamiliar territory, or can be used to direct an aircraft along a predetermined azimuth vector which is aligned with a desired flight path.

The present invention provides a simple transmitter system which is compact, light and portable and which can be installed at the end of an airport runway. The transmitter system includes an antenna pair on a baseline at right angles to the desired course or runway centerline. A conventional VOR receiver responds to the transmitter signals with an indication of the aircraft horizontal displacement from the desired course or runway centerline. The transmitters of the present invention are designed to have a limited range and are intended to operate in the approach zone of the landing strip. The system is non interfering with conventional Omnirange stations, and, since the equipment of the present invention is intended to be used only in the approach zone of the airport, the Azimuth information, normally provided by an Omnirange station, is not needed. The preferred embodiment is shown and discussed at page 74 of the January 25, 1965 issue of Aviation Week and Space Technology, volume 82, Number 4. Alternative embodiments can provide audio information signals which identify the transmitter.

In operation, the present invention enables the pilot of an aircraft, if equipped with VHF Omnirange or VOR equipment, to locate the center line of an airport runway and to direct the aircraft until the aircraft position coincides with the center line. Deviations from this course, result in a deflection of the needle on the instrument panel. As the distance between the vehicle and the end of the runway decreases, the needle will become more and more sensitive to slight deviations from the correct course.

The present invention includes a pair of transmitters which operate at nominally the same carrier signal frequency. One, a reference transmitter, operates at a first frequency which differs from the second, data transmitter, by exactly 30 cycles per second. The antenna for each transmitter is placed on a base line which is perpendicular to the center line of the runway of the airport. In a preferred embodiment, the antenna separation is equal to one half of a wave length at the carrier signal frequency.

The reference transmitter also transmits a subcarrier signal of 9960 cycles per second that is frequency modulated by a 30 cycle per second reference signal. The data transmitter is substantially identical to the reference transmitter and utilizes a voltage controlled oscillator that controls the output frequency. Additional apparatus is provided to maintain the two output signals in phase coherence or phase lock, although separated by 30 cycles. Feedback networks provide a signal to the voltage controlled oscillator to maintain this phase coherent relationship.

In yet another embodiment a second transmitter pair is provided which operates at a different frequency, which may be in the VHF Omnirange band. The second transmitter pair is arranged on a baseline parallel to the runway center line and at right angles to the baseline of the first pair. This transmitter pair will then provide a positive signal indication of the penetration of a vertical plane that is at right angles to the center line of the runway. Aircraft equipped with a second, substantially identical VOR receiver which is tuned to the different frequency can then identify the instant when both Omni receivers display centered needles. Such an embodiment enables the pin pointing of a geographical location under conditions of impaired visibility or poorly marked terrain. Further, the equipment could also be used to identify specific areas not otherwise distinguished from the air.

An aircraft on an azimuth vector that is coincident with the runway center line, will receive signals from the two antennas that are in phase so long as the aircraft remains on the center line approaching the runway. When the aircraft azimuth vector is at an angle with the center line, the phase of the reference transmitter signal will no longer coincide with the phase of the data transmitter signal and will differ by a phase angle that is related to the difference in the lengths of the signal paths from the two antennas to the aircraft.

In the preferred embodiment, an aircraft flying along the antenna baseline would receive signals that differ in phase by one half wave length. Clearly, the signal travel paths differ by the one half wave length separating the two antennas. The VOR receiver responds to the phase difference information and displays a needle pointer deflection that is proportional to the phase difference. Accordingly, a zero phase difference detected along the runway center line, is indicated by a centered needle. Progressively larger phase differences are signaled by increasing needle deflection. The indication also conveys "sense" information which signals the direction that the aircraft must move in order to intercept the intended radial. The system is designed so that the pilot must "fly" toward the needle to correct his heading, as with other navigational aids currently in use.

In an alternative embodiment of the invention, the antennas are separated by one wave length at the carrier frequency. Means are provided to generate the phase lock and data frequency which is offset by 30 cycles as before. In the aircraft, however, the needle indicator will be more sensitive to deviations from the correct path in the approach area.

The phase difference of the data and reference signals is proportional to the cosine of the angle between the vector to the aircraft from the center of the transmitter antenna pair baseline and that baseline, but multiplied by a factor that is derived from the spacing between the antennas.

In yet other embodiments, if glide slope information is desired, a second transmitting pair can be provided operating on different carrier frequencies. In this embodiment the baseline is in the vertical plane that includes the runway center line, but is slightly inclined from the vertical so that the plane of radiation including zero phase shift information, extends from the runway end at the proper glide slope angle. A simple VOR-Omni needle indicator, rotated by 90 degrees, or a standard cross-pointer indicator, could then indicate to a pilot whether the aircraft path was above or below the desired glide slope path.

Accordingly, it is an object of the present invention to provide an improved radio navigational aid to aircraft with limited radio equipment.

It is an additional object of the invention to provide inexpensive portable azimuth beacons to enable alignment with a predetermined baseline.

It is yet another object of the invention to provide a simple transmitter pair with associated antennas that is portable and easily transported and which can be used in conjunction with presently existing aircraft navigational equipment.

It is yet an additional object of the invention to provide an azimuth transmitter which opeartes within the frequency spectrum of conventional radio aids to navigation but without interference with such radio aids.

It is yet an additional object of the invention to provide an improved localizer system which is operable with existing VOR-Omni facilities aboard aircraft.

It is yet another object of the invention to provide an improved, inexpensive radio navigation equipment.

It is a still further object of the invention to provide an improved radio aid to navigation including an antenna pair spaced apart by a distance of one half wave length of the transmitted signal frequency, that provides a unique signal indication to a remote receiver positioned in space on the perpendicular bisector of the baseline.

It is yet another object of the invention to provide an improved radio aid to navigation which signals aircraft on conventional Omni receiving equipment to provide a visual indication of a desired approach path.

It is yet an additional object of the invention to provide a novel radio aid to navigation operable in conjunction with existing aircraft Omnirange receivers, and to provide a visual indication of heading with respect to a predetermined flight path which is increasingly sensitive to deviations from that path, with decreasing slant range to the transmitter.

It is still a further object of the invention to provide a light, portable radio aid to navigation which can be operated in conjunction with conventional Omnirange receivers in remote areas where conventional radio aids to navigation are not available.

It is yet a further object of the invention to provide an easily transportable radio aid to navigation which may operate substantially unattended in remote and relatively inaccessible locations.

The novel features which are believed to be characteristic of the invention, both as to organization and method of operation, together with further objects and advantages thereof will be better understood from the following description considered in connection with the acompanying drawings in which several preferred embodiments of the invention are illustrated by way of example. It is to be expressly understood, however, that the drawings are for the purpose of illustration and description only and are not intended as a definition of the limits of the invention.

The physical principle upon which the present invention is based is that the phase difference between signals transmitted to a point receiver, from a pair of spaced antennas, is proportional to the direction cosine of the straight line joining the point receiver and the center of the antenna base line, assuming the base line dimension to be much smaller than the slant range between the receiver and transmitter.

Figure 1A:
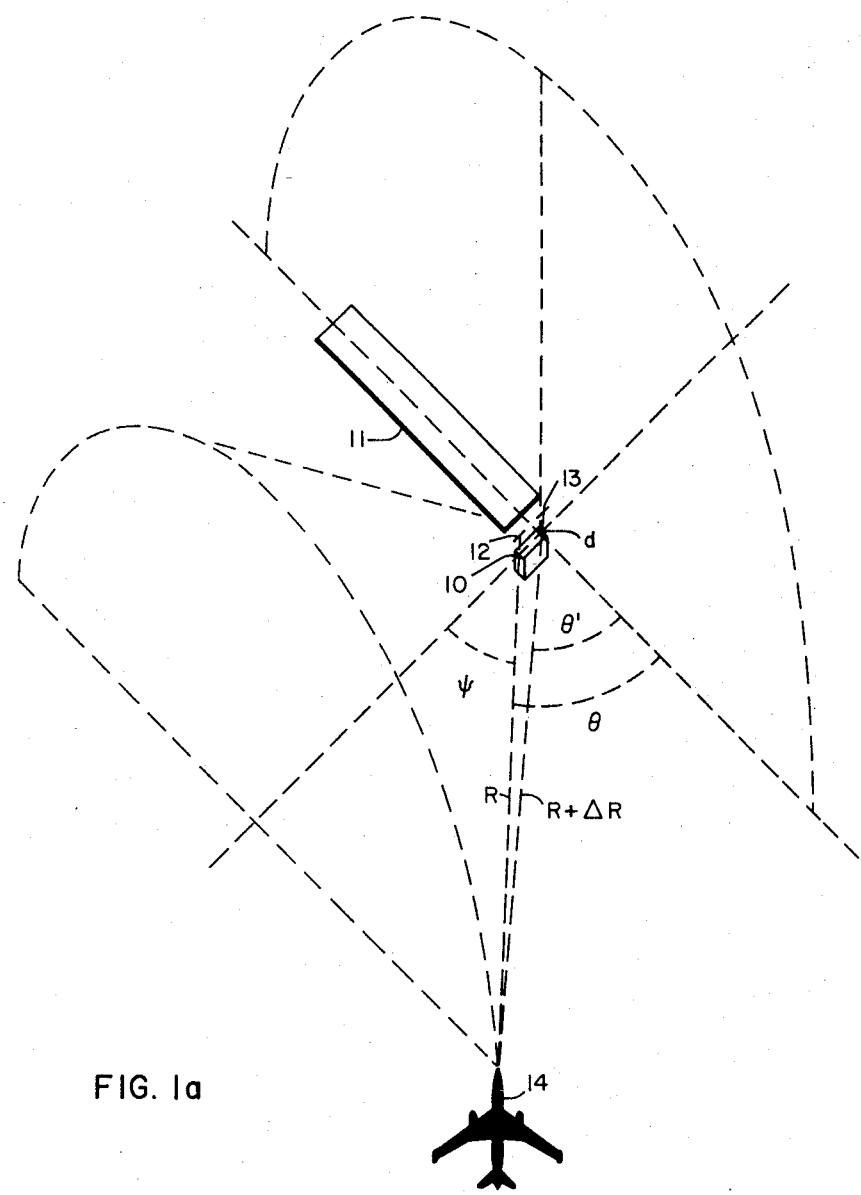
FIGURE 1a is a diagrammatic sketch of an airport runway and the surrounding area which illustrates the geometry of the system of the present invention.
Figure 1B:
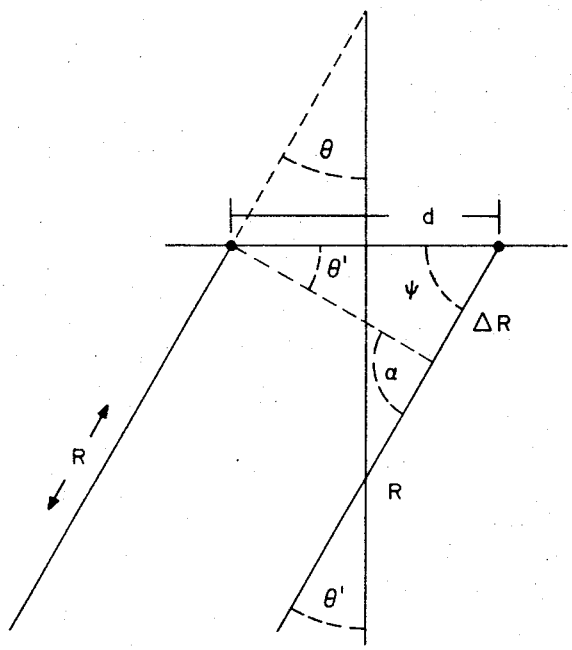
FIGURE 1b is a geometric diagram representing the physical principles employed in this operation of the system of the present invention.

Referring now to the drawings and, in particular to FIG. 1, which includes FIGS. 1a and 1b, there is a geometric diagram serving to illustrate this physical principle. In particular, the system 10 having a pair of signal transmitters which radiate signals respectively through spaced antennas 12 and 13 are positioned at the end of a runway 11. A receiver in an aircraft 14, is remotely located at slant range R. The antennas are spaced at a base line distance designated $d$. The transmitted signals from the antennas 12 and 13 to the aircraft 14, travel distances designated R, and $R+\Delta R$ respectively. The diagram of FIG. 1b shows that the phase difference, in wave length, between the signals received at the aircraft 14, from the first antenna 12 and the second antenna 13 will be $\Phi = h\lambda = R + \Delta R - R = \Delta R$, where $\lambda$ is the carrier signal wave length, and $h$ is a factor that is related to base line separation of antennas and the angle of the slant range vector.

Assuming that the distance R is significantly much greater than the antenna base line, angle $\theta \simeq \theta'$ and angle $\alpha$ is approximately 90°, then $\phi = \Delta R = d \sin \theta$. Alternatively, $\phi = d \cos(90-\theta) = d \cos \psi$, where $\psi$ is the angle between the base line and the vector to the receiver. At the transmitters, each azimuth vector will include a unique phase difference that is a function of its angular separation either from a perpendicular bisector of the base line ($\theta$) or from the base line ($\psi$) and which, in the case of a vector coincident with the bisector, that is $\theta = 0°$, or $\psi = 90°$, $d \sin 0° = d \cos 90° = 0$, which results in a phase difference of 0°.

Similarly, any given phase measurement, at the receiver, corresponds to a unique direction vector from the transmitters. If the receiver continues to move along the vector, no change in phase difference will be noted. However, the phase difference information can be used to find the vector of 0° phase difference which will coincide with the desired heading.

If the base line is selected to be $\lambda/2$ or ½ the wave length of the signal at the carrier frequency, then considering the circle in the ground plane, whose center is the midpoint of the base line, phase difference will vary from a maximum of 180° ($\lambda/2$) for a receiver aligned with the base line to 0° for a receiver aligned with the perpendicular bisector of the base line. Actually, each phase difference value defines a conical surface having an apex at the center of the base line and an angle between the base line and the surface.

The present invention can be utilized to give calibrated azimuth angular information. However, in the primary case, the system is used to operate a VOR Omni range needle which is deflected in proportion to the phase difference. It is sufficient that the VOR Omni range receiver be sensitive to detect phase differences between 0° and 180°. In the approach zone, and with a limited transmission range, the accuracy of the display is adequate. FIG. 1a, the antenna base line $d$, is at right angles to the centerline of the runway. The antenna pair 12, 13 is positioned at the end of the runway so that the perpendicular bisector of the base line coincides with the center line of the runway.

If problems of airport orientation, such as terrain, preclude the placement of the antenna pair at the edge of the runway, the equipment can be placed near the end of the runway with the perpendicular bisector of the base line parallel to the center line of the runway.

In the event that it is desired to determine when a vertical plane, including the base line, has been penetrated, the preferred embodiment will provide, at any given altitude, the maximum phase difference, detectable at that altitude. Should it be desired to fly a pattern under instrument conditions or, for some reason the position of the plane relative to the end of the runway must be noted, a course parallel with and adjacent to the center line of the runway will result in display needle deflections which increase to a maximum when passing through the plane of the end of the runway, and then decrease again as the phase difference continues to change.

It will be understood that other antenna spacings along the base line could be employed in practicing the present invention. For example, if the data and references antennas are separated by a distance equivalent to one wave length of the carrier frequency, then, in the ground plane, the phase difference detected will vary from 0° (along the bisector of the base line) to 180° at an azimuth angle of 45° with the runway center line to 0° phase shift when aligned with the base line.

Recalling the mathematical derivation in connection with the description of FIG. 1, the difference in signal path between the first and second antenna to the vehicle is $d \sin \theta$ where $\theta$ is the angle between the azimuth vector to the aircraft and the bisector of the base line. The phase shift in degrees, represented by this difference in path is, of course, a function of the wave length of the carrier signal.

Other embodiments selecting different antenna spacings could enable virtually any desired pattern of maximum and minimum phase shifts, as a function of azimuth angle.

Figure 2:
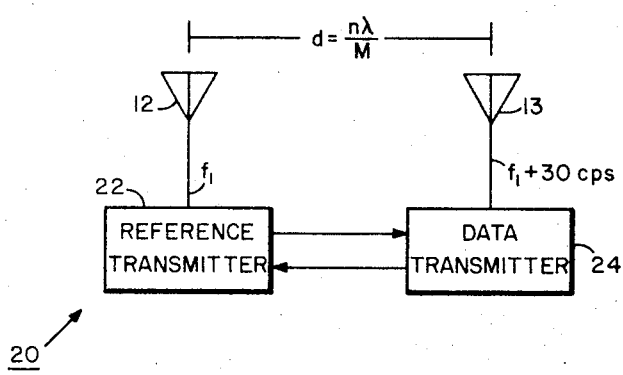
FIGURE 2 is a block diagram of a radio aid to navigation according to the present invention.

Turning next to FIG. 2, there is shown a block diagram of a radio navigation system 20 of the present invention. A first or reference transmitter 22 is connected to the first antenna 12 and a second or data transmitter 24 is connected to the second antenna 13. The reference transmitter 22 is operated at a frequency $f_1$ and the data transmitter 24 is operated at a frequency of $f_1+30$ c.p.s.

The first and second transmitters 22, 24 are interconnected so that the signal generated by the data transmitter 24 and radiated from the second antenna 13 is maintained in phase coherence with the signal generated by the reference transmitter 22, and radiated from the first antenna 12. The base line distance separating the first and second antennas 12, 13, in the preferred embodiment, is a distance $d$ equal to ½ of a wave length, of a signal at frequency $f_1$.

In the intended application, Omnirange signal band is between 108 and 118 megacycles per second. Accordingly, the distance separating the antennas is $\lambda/2$ which ranges between approximately 1.4 meters for a carrier frequency of 108 megacycles and 1.27 meters, for a carrier frequency of 118 megacycles. An adjustment to vary the separation can be provided which can be calibrated in terms of the radiating signal carrier frequency.

Figure 3:
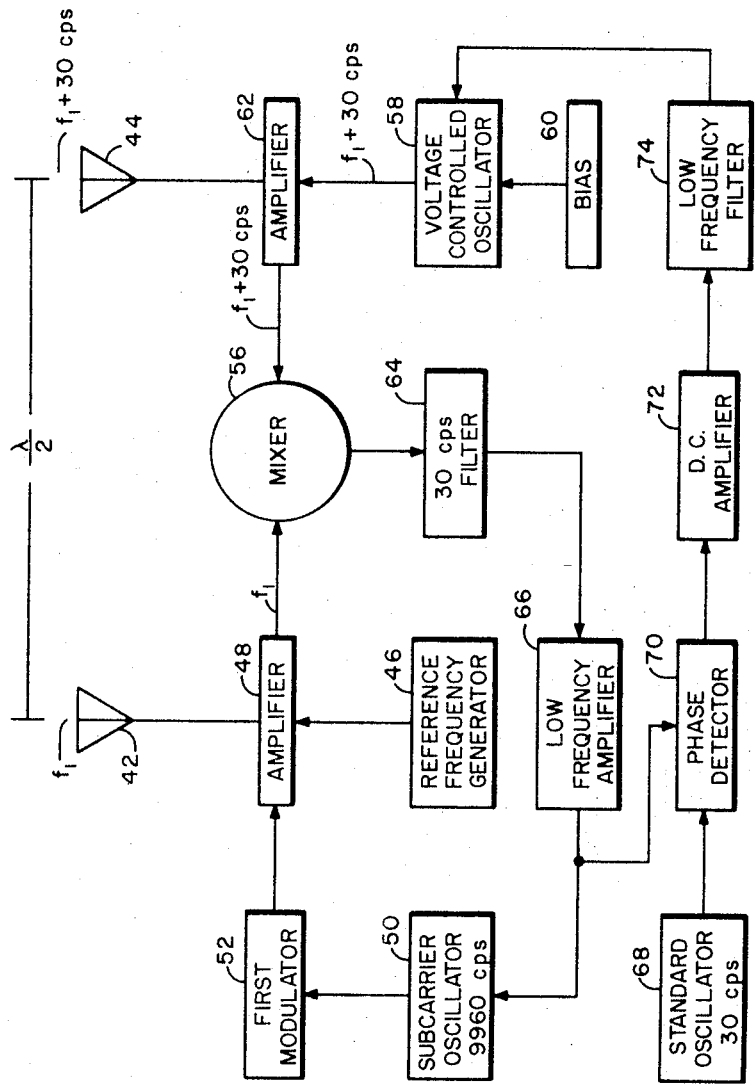
FIGURE 3 is a detailed block diagram of a preferred embodiment of the present invention.

Turning next to FIG. 3, there is shown in more detailed block diagram, a navigational aid system that will produce signals utilizable with conventional VHF or VOR Omnirange equipment normally found in aircraft. The system 40 includes, a first or reference antenna 42, and a second or data antenna 44, separated along a base line by a distance equal to ½ the wave length of a signal at the carrier frequency $f_1$. A reference frequency generator 46, is used to provide the basic reference carrier signal at frequency $f_1$. The carrier signal is applied to an amplifier 48 which then applies the amplified signal to the first antenna 42.

A subcarrier oscillator 50, generates a subcarrier signal, which if used with VOR Omni equipment is at 9,960 c.p.s. The subcarrier signal is frequency modulated by a 30 c.p.s. reference signal. The output of oscillator 50 is applied to a first modulating circuit 52 which is connected to the amplifier 48 to amplitude modulate the reference carrier signal with the frequency modulated subcarrier signal. The output of the amplifier 48 is applied to the reference antenna 42 for subsequent radiation. A portion of the modulated carrier signal from the amplifier 48 is also applied to a mixer 56.

Looking now at the second or data transmitter portion, there is provided a voltage controlled oscillator 58, which nominally generates a data carrier signal at frequency $f_1$. A bias source 60 is provided to drive the oscillator 58 at the frequency $f_1+30$ c.p.s., which is the desired data carrier signal frequency.

The output of the voltage controlled oscillator 58 is applied to a second amplifier 62 and then to the second or data antenna 44 from whence it is radiated. A portion of the signal from the second amplifier 62, is also applied to a second input of the mixer 56. The output of the mixer 56 is then a signal having a frequency equal to the difference in frequency between the output of the reference amplifier 48, and the data amplifier 62.

In this embodiment, the resultant signal has a frequency of 30 c.p.s. This 30 cycles signal is applied to a 30 cycle filter 64, and from there to a low frequency amplifier 66. The output of the low frequency amplifier 66 is applied to the subcarrier oscillator 50 where the 30 cycle signal is frequency modulated upon the subcarrier signal.

A stable, independent standard oscillator 68 provides a 30 cycle frequency standard signal which is ultimately utilized throughout the system. This oscillator 68 is connected to one input of a phase detector 70. The other input to the phase detector 70 is connected to the output of the low frequency amplifier 66. As noted above, the output of the low frequency amplifier is derived from the signals then being transmitted by the data transmitters.

The phase detector 70 maintains a predetermined phase relationship between the phase of the signal produced by the 30 cycle standard source 68 and the phase of the outgoing signal. Any deviation from the predetermined relationship is signaled by a D.C. voltage from the phase detector 70 which is applied to a D.C. amplifier 72. The amplified output is then filtered by low frequency filter 74 and applied to a control input of the voltage controlled oscillator 58. This circuit maintains phase coherence between the reference and the data signals.

In operation, the reference frequency signal is generated by a highly accurate, crystal controlled oscillator, together with suitable multiplying or dividing circuits in the reference generator 46 stages. The reference carrier signal of frequency $f_1$ is amplitude-modulated by 9,960 cycle per second subcarrier signal which, in turn, has been frequency modulated by a 30 cycle per second sine wave which is derived from the mixer 56. The voltage controlled oscillator 58 is maintained in phase coherence, by a feed-back loop which includes the mixer 56, and a highly stable oscillator. In other embodiments, the oscillator can be operated at higher frequencies if suitable frequency dividing stages are provided to produce the 30 c.p.s. sine wave.

In the preferred embodiment, the phase of the reference 30 cycle signal is maintained 90° out of phase with the signal of the 30 cycle standard signals. Under these circumstances, the output of the phase detector 70, is normally at 0 volts D.C. If the output of the transmitters shift in phase, relative to each other, the 30 c.p.s. signal from the mixer 56 reflects this shift and, when applied to the phase detector 70, generates a D.C. error voltage, whose polarity is in the direction of the shift. This error voltage is then applied to the VCO 58 and restores the phase relationship of the two carrier signals.

It will be understood, that in practicing the present invention, many equipment variations are possible. For example, other equivalent electronic equipments could be used to phase lock the data and reference carrier signals. Also, other internal circuits can be used to modulate the 9,960 c.p.s. subcarrier with the 30 c.p.s. signal, and amplitude modulate the subcarrier on the reference carrier signal.

It is therefore clear that the particular hardware embodiments are well within the state of the art, once the underlying principles have been set forth. It will be understood, of course, that since the present apparatus is designed to work on the frequency bands normally assigned to radio aids to navigation, the range of the equipment of the present invention is necessarily limited so as not to be interfering with navigational aids already in operation.

If it is desired to use the present invention in remote areas where radio aids to navigation do not exist, the radiating power can be increased substantially so that the device of the instant invention can provide a homing beacon that is inexpensive, efficient and operable with already installed aircraft radio equipment. It is also possible to utilize other frequency bands in other countries.

Other modifications are possible such as the incorporation of a voice link which could include a prerecorded message identifying the transmitter and its location. In such an embodiment, a unit according to the present invention would serve to identify itself to receivers within range of its transmission. The only necessary modification to the existing equipment would be a tape recorder whose audio output is applied as a separate modulation on the reference carrier signal.

The use of airborne equipment to provide the azimuth information and display is the normal operation of the existing omirange equipment. Such equipment is also described in the recent patent to J. Villiers for "Omnidirectional Altimetric Radar," Patent No. 3,181,143, issued Apr. 27, 1965, in column 5, lines 39 and following.

For any approach path, the ground station reference phase versus the data phase can be calibrated by the manual phase shift control so that the course deviation needle can be centered and the "TO-FROM" indicator reads "TO" when the course selector is set to the approach course, as noted on the standard approach chart. The needle will then deflect in the same manner as an ILS localizer needle during approach.

A so-called "back course" approach can also be made with this system, but, in this circumstance, the course selector is set to the back course heading and the indication would be "FROM" (indicating back course). However, as opposed to the normal ILS back course approach, the needle must be read normally instead of backwards.

Thus, there has been shown a radio aid to navigation which cooperates with existing VHF omnirange equipment (VOR) currently in use, and which is generally available. The system of the present invention, by a unique combination of transmitters and antennas, provides a composite output signal of a highly directional nature. When received by a VOR receiver and needle a visual display is provided that corresponds to the heading of the vehicle, relative to a predetermined azimuth with respect to the base line of the transmitter antennas.

The present invention utilizes transmitting signal frequencies in the VHF frequency spectrum and employs a subcarrier signal frequency of 9,960 cycles per second with a 30 cycle per second modulation, such as is presently employed in conventional omnirange systems. However, the information received from the transmitters of the present invention, enables the existing omni needle indicator available in the cockpit to be used as the azimuth portion of an instrument landing system.

An aircraft that is on an azimuth coincident with the perpendicular bisector of the antenna base line will, so long as the aircraft remains on course and in the proper heading, provide a centered needle display. Deviations from the predetermined azimuth will produce needle deflections in the cockpit, indicative of an error in heading. The sensitivity of the present system increases with decreasing range so that minor deviations, when close to the transmitter, provide substantial needle deflections. Thus, the present system can serve to indicate, in relative fashion, the approximate distance to the transmitter.

Similarly, a pair of systems according to the present invention could be used to provide both azimuth and angle-of-approach information by proper orientation of the two antenna base lines. In this case, a second VOR receiver and display must be located in the remote vehicle. The appropriate radiation pattern of the second system is produced by locating the base line of the second antenna pair in the plane orthogonal to the base line of the first pair. The desired angle of approach can be indicated by suitable orientation of the second base line with respect to the vertical.

Other variations will be obvious to those skilled in the art, such as a change in transmitting signal frequencies for use in geographical areas where such frequencies are permitted in conjunction with radio aids to navigation, recognizing, of course, that the omnirange receivers cooperating therewith must be provided with suitable tuning means to receive such other transmitting signal. Also, the selection of antenna spacings is within the skill of the art, and multi-lobed radiation patterns may be desirable in certain limited applications, in which case the antenna spacing may be some multiple of $\lambda$, the wave length of the transmitted carrier signal.

What is claimed as new is:

1. A portable, compact radio aid to navigation system operable in conjunction with a remote VHF omnirange receiver, (VOR) to provide at the receiver a visual display of deviation from a predetermined vector heading from the receiver toward the system, the system comprising:
  (A) portable first transmitting means for generating and transmitting a first carrier signal in the VHF frequency range and second transmitting means for generating and transmitting a second carrier signal at a frequency offset by 30 cycles per second from said first carrier signal frequency and in phase coherence with said first carrier signal;
  (B) first antenna means coupled to said first transmitting means for radiating said first carrier signal in a predetermined pattern; and
  (C) second antenna means coupled to said second transmitting means for radiating said second carrier signal in a predetermined pattern;
    said first and second antenna means being positioned along a common base line and separated by a distance $$\frac{n\lambda}{m}$$

$\lambda$ being equal to the wave length of said first carrier signal and $n$ and $m$ are integers, to provide to a remote omnirange receiver first and second carrier signals with a phase difference proportional to $n\lambda/m \cos \theta$, where $\theta$ is substantially equal to the angle existing between said base line and a vector from said antenna means to the remote receiver in addition to any phase difference that is attributable to the phase coherent generation of carrier signals at different frequencies.

2. A radio aid to navigation system as in claim 1 above, wherein $n=1$, $m=2$, and $\lambda$ ranges between 2.0 meters and 3.0 meters.

3. The combination with a radio aid to navigation system operable in conjunction with a remote VHF omnirange receiver (VOR) to provide at the remote omnirange receiver a visual display of deviation from a predetermined vector heading toward the system, the system including a first transmitter for generating and transmitting a first carrier signal in the VHF frequency range and a second transmitter for generating and transmitting a second carrier signal at a frequency offset from the first carrier signal frequency by 30 cycles per second and in phase coherence therewith of a portable antenna system comprising:
  (A) first antenna means coupled to the first transmitter for radiating the first carrier signal in a predetermined pattern;
  (B) second antenna means coupled to the second transmitter for radiating the second carrier signal in a predetermined pattern; and
  (C) means, calibrated in terms of carrier signal frequency, for varying the separation of said first and second antenna means along a common base line;
    said first and second antenna means being mounted along said base line and separated by a distance $n\lambda/m$ where $\lambda$ is equivalent to the wave length of the first carrier signal, and $n$ and $m$ are integers, to provide to a remote receiver first and second carrier signals with a phase difference proportional to $n\lambda/m \cos \theta$, where $\theta$ is substantially equal to the angle existing between the base line and a vector extending from said antenna means to the remote receiver in addition to the phase difference resulting from the phase coherent generation of signals at differing frequencies.

4. The antenna system of claim 3 above, wherein $n=1$, and $m=2$, and $\lambda$ is between 2.0 meters and 3.0 meters.

5. A portable radio aid to navigation operable in conjunction with VHF omnirange receiving equipment (VOR) for indicating, with such equipment, the deviation from a predetermined desired heading, the navigation aid comprising:
  a portable transmitter including (A) first transmitting means for generating a first carrier signal having a frequency $F_1$ in the VHF band;
  (B) second transmitting means for generating a second carrier signal having a frequency $F_1+30$ cycles per second;
  (C) phase lock means coupled to said first and second transmitting means for maintaining phase coherence between said first and second carrier signals;
  (D) standardizing means coupled to said phase lock means for maintaining phase coherence between the 30 cycle frequency component of said second carrier signal and a standard oscillating means generating a standard 30 cycle signal;
  (E) subcarrier generating means connected to said phase lock means and said first transmitting means for generating and modulating upon said first carrier signal a subcarrier signal having a frequency $F_2$;
  (F) modulating means for modulating a reference signal of frequency fe upon said subcarrier signal in substantial phase coherence with the 30 cycle per second frequency component of said second carrier signal;

and a portable antenna array including (G) first antenna means connected to said first transmitting means for radiating said first carrier signal;

(H) second antenna means connected to said second transmitting means for radiating said second carrier signal; and (I) adjusting means, calibrated in terms of carrier signal frequency, coupling said first and second antenna means for varying the separation therebetween a common base line, orthogonal to a desired predetermined reference line, said antenna means being separable to a distance equal to $n\lambda/m$ where $n$ and $m$ are integers and $\lambda$ is the wave length of the first carrier signal to provide to a spatially remote receiver located in a plane orthogonal to said base line, that includes the perpendicular bisector of the base line between said antenna means, first and second carrier signals in predetermined phase coherence, and to spatially remote receivers in the other locations first and second carrier signals that are out of phase by amounts depending upon $n$, $m$ and the angle between the predetermined reference line and a vector from the receiver to the transmitting means in addition to the phase difference attributable to the phase coherent generation of signals of different frequencies.

6. A radio aid to navigation as in claim 5 above, wherein $n=1$, $m=2$, and F, is between 100 megacycles per second and 200 megacycles per second.

7. A portable destination azimuth indicating system operable in conjunction with VHF omnirange (VOR) receiving equipment carried by a vehicle, the system comprising:

(A) first transmitting means including a first signal means for generating a first carrier signal of frequency $f_1$ where $f_1$ includes the frequency range between 100 and 200 megacycles per second;

(B) second signal means for generating a subcarrier signal of frequency $f_2$ equal to 9960 cycles per second;

(C) third signal means for deriving a reference signal of frequency $f_3$ equal to 30 cycles per second;

(D) modulating means connected to said signal means for impressing said reference signal upon said subcarrier signal and said subcarrier signal upon said carrier signal; and (E) first antenna means for radiating said first carrier signal impressed with said subcarrier and reference signals; and (F) second transmitting means including generating means coupled to said first transmitting means, for generating a second carrier signal of frequency $(f_1+f_3)$ in phase coherence with said first carrier signal and second antenna means for radiating said carrier second signal; portable means for containing said first and second transmitting means;

said first and second antenna means including first and second antennas adjustably mounted on a base line perpendicular to the desired destination azimuth line, said antennas being separable to a distance $n\lambda/m$ where $n$ and $m$ are integers greater than zero, and $\lambda$ is the wave length of a signal of frequency $f_1$, for providing to a receiver positioned along the predetermined destination azimuth line first and second carrier signals in predetermined phase relationship attributable to phase coherent generation of said first and second carrier signals, and to receivers located off of the predetermined destination azimuth line first and second carrier signals having a phase difference proportional to the angle between predetermined azimuth line and a vector from the receiver to said antennas in addition to the predetermined phase relationship, the receivers responding to the phase difference to provide an indication of course to follow in order to arrive at the desired destination.

8. A destination azimuth indicating system as in claim 7 above, wherein $n=1$ and $m=2$.

References Cited

UNITED STATES PATENTS

| 2,582,350 | 1/1952 | O'Brien | 343—105 |
| 2,748,385 | 5/1956 | Rust et al. | 343—105 X |
| 3,111,671 | 11/1963 | Thompson | 343—105 X |
| 3,117,319 | 1/1964 | Stover | 343—105 |
| 3,142,062 | 7/1964 | Held | 343—106 |

RODNEY D. BENNETT, *Primary Examiner.*

H. C. WAMSLEY, *Assistant Examiner.*